(12) United States Patent
Murgatroyd et al.

(10) Patent No.: US 10,301,475 B2
(45) Date of Patent: May 28, 2019

(54) HEAVY METAL FREE, BLUE AND NAVY FIBRE-REACTIVE DYE MIXTURES

(71) Applicant: DyStar Colours Distribution GmbH, Raunheim (DE)

(72) Inventors: Adrian Murgatroyd, Frankfurt am Main (DE); Manfred Hoppe, Kürten (DE); Clemens Grund, Hattersheim (DE); Brian Connolly, Lohmar (DE); Thomas Stepanski, Köln (DE)

(73) Assignee: DryStar Colours Distribution GmbH (DE)

( * ) Notice: Subject to any disclaimer, the term of this patent is extended or adjusted under 35 U.S.C. 154(b) by 0 days.

(21) Appl. No.: 15/531,158

(22) PCT Filed: Oct. 26, 2016

(86) PCT No.: PCT/EP2016/075777
§ 371 (c)(1),
(2) Date: May 26, 2017

(87) PCT Pub. No.: WO2017/076713
PCT Pub. Date: May 11, 2017

(65) Prior Publication Data
US 2018/0230311 A1    Aug. 16, 2018

(30) Foreign Application Priority Data

Nov. 2, 2015 (EP) .................... 15192482

(51) Int. Cl.
| C09B 19/02 | (2006.01) |
| C09B 62/51 | (2006.01) |
| C09B 67/22 | (2006.01) |
| D06P 3/16 | (2006.01) |
| C09B 62/513 | (2006.01) |

(52) U.S. Cl.
CPC ............ *C09B 67/0042* (2013.01); *D06P 3/16* (2013.01); *C09B 19/02* (2013.01); *C09B 62/513* (2013.01)

(58) Field of Classification Search
CPC .......................... C09B 67/0042; C09B 19/02
See application file for complete search history.

(56) References Cited

U.S. PATENT DOCUMENTS

| 4,629,788 A | 12/1986 | Jäger |
| 4,705,524 A | 11/1987 | Hähnke et al. |
| 5,484,899 A | 1/1996 | Deitz et al. |
| 6,358,287 B1 | 3/2002 | Ehrenberg et al. |

FOREIGN PATENT DOCUMENTS

| EP | 0141996 A2 | 5/1985 |
| EP | 0224224 A2 | 6/1987 |
| EP | 0623655 A1 | 11/1994 |
| EP | 1043366 A2 | 10/2000 |
| JP | 2000044830 A | 2/2000 |
| JP | 2001098183 A | 4/2001 |
| WO | WO-02100953 A1 | 12/2002 |
| WO | WO-2005097911 A1 | 10/2005 |
| WO | WO-2009053238 A2 | 4/2009 |

OTHER PUBLICATIONS

Kashiwane, et al. Document No. 113:99391, retrieved from STN; entered in STN on Sep. 16, 1990.*
Gu, et al. Document No. 157:710694, retrieved from STN; entered in STN on Nov. 11, 2012.*
Araki, et al. Document No. 132:167671, retrieved from STN; entered in STN on Feb. 15, 2000.*
International Search Report for PCT/EP2016/075777 dated Jan. 19, 2017.
Written Opinion of the International Searching Authority for PCT/EP2016/075777 dated Jan. 19, 2017.

* cited by examiner

*Primary Examiner* — Shawquia Jackson
(74) *Attorney, Agent, or Firm* — Drinker Biddle & Reath LLP

(57) ABSTRACT

The invention relates to mixtures of fiber-reactive Triphendioxazine dyes with other fiber-reactive azo dyes and their use for the dyeing of hydroxyl- and especially carboxamide-containing material in blue and navy shades.

15 Claims, No Drawings

HEAVY METAL FREE, BLUE AND NAVY FIBRE-REACTIVE DYE MIXTURES

CROSS-REFERENCE TO RELATED APPLICATIONS

This application is a national stage application (under 35 U.S.C. § 371) of PCT/EP2016/075777, filed Oct. 26, 2016, which claims benefit of European Application No. 15192482.6, filed Nov. 2, 2015, both of which are incorporated herein by reference in their entirety.

The invention relates to mixtures of fibre-reactive Triphendioxazine dyes with other fibre-reactive azo dyes and their use for the dyeing of hydroxyl- and especially carboxamide-containing material in blue and navy shades.

Fibre-reactive Triphendioxazine dyes are of interest due to their high molar colour strength to produce blue dyeings of high brilliancy and good fastness levels. Triphendioxazine-chromophores have been used in mixtures (WO 2009/053238, JP 2000/044830) as well, however, due to the chromophoric structure, especially pure vinylsulfone/sulfatoethylsulfonyl-Triphendioxozine dyes often show "blocking effects" and are therefore not common in dye mixtures.

High fastness requirements are often only reached by dyes containing heavy metals, especially on wool, were Mordant dyes (after chrome dyes) give the highest fastness levels. But their usability has decreased during the last years, since the restrictions on the usage of heavy metals, especially chromium, have increased dramatically.

Due to these restrictions, there is a need for new dyestuffs with good build-up, high light- and wet-fastness, which comply with ecological standards. Using standard reactive dyes as a substitute for mordant dyes, however, finds its limit when it comes to stability against oxidizing agents. The invention includes dye mixtures, which possess these technical properties to a high degree, additionally are stable to treatment with oxidizing agents and at the same time make the use of heavy metals superfluous.

The present invention in this field of fibre-reactive dyes is directed to a dye mixture comprising at least one dye of formula (I)

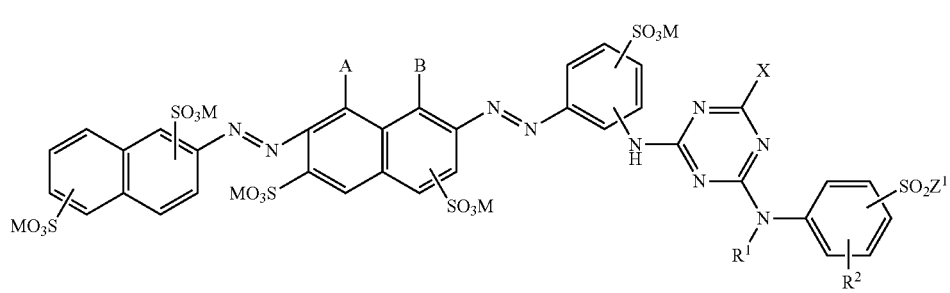

and at least one dye of formula (II)

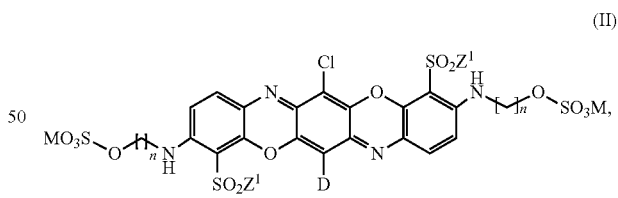

wherein independent of each other
A is OH and B is $NH_2$ or A is $NH_2$ and B is OH,
D is $(C_1-C_4)$-alkyl or Cl,
$R^1$ is hydrogen or $(C_1-C_4)$-alkyl,
$R^2$ is hydrogen, $(C_1-C_4)$-alkyl, $(C_1-C_4)$-alkoxy or sulfo,
$Z^1$ is $-CH=CH_2$, $-CH_2CH_2G$ or hydroxyl,
  wherein
  G is hydroxyl or an alkali-detachable group;
X is Cl or F,
n is 2 or 3 and
M is hydrogen, an alkali metal or one equivalent of an alkaline earth metal.

Preferred is a dye mixture as described above, comprising at least one dye of formula (Ia)

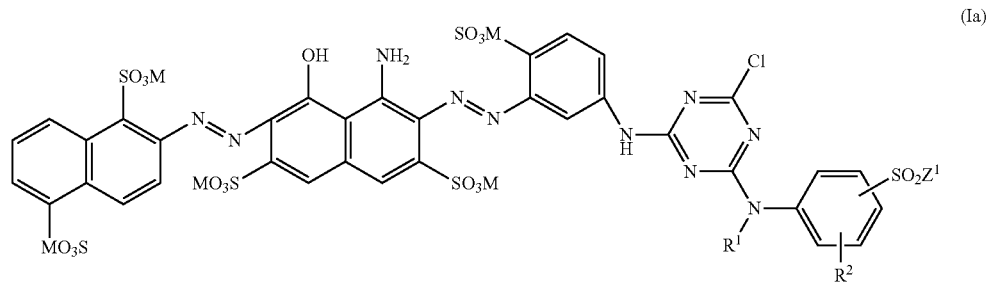

(Ia)

wherein
R¹ is hydrogen, methyl or ethyl,
R² is hydrogen, (C₁-C₂)-alkyl, (C₁-C₂)-alkoxy or sulfo,
Z¹ is —CH=CH₂, —CH₂CH₂G or hydroxyl,
  wherein
  G is hydroxyl or an alkali-detachable group,
and
M is hydrogen, an alkali metal or one equivalent of an alkaline earth metal.

More preferred is a dye mixture as described above comprising at least one dye of formula (Ib)

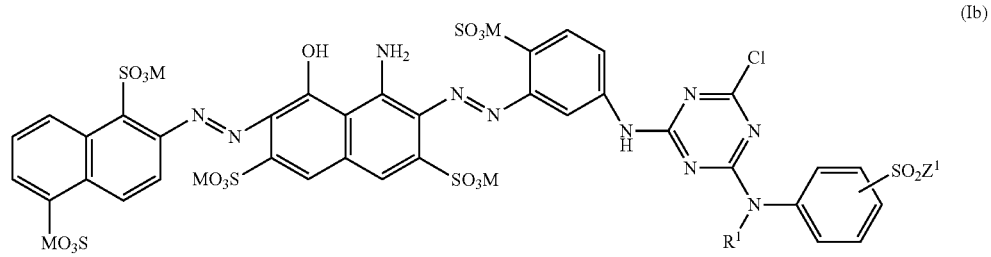

(Ib)

wherein
R¹ is hydrogen, methyl or ethyl,
Z¹ is —CH=CH₂, —CH₂CH₂G or hydroxyl,
  wherein
  G is hydroxyl or an alkali-detachable group and
M is hydrogen, an alkali metal or one equivalent of an alkaline earth metal.

Even more preferred is a dye mixture as described above, comprising at least one dye selected from the group consisting of:

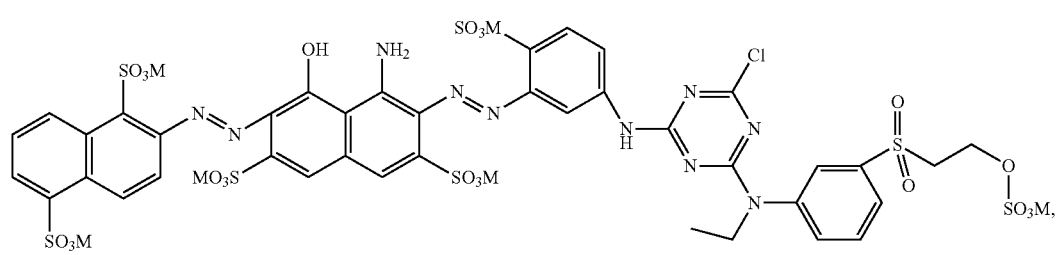

(I-1)

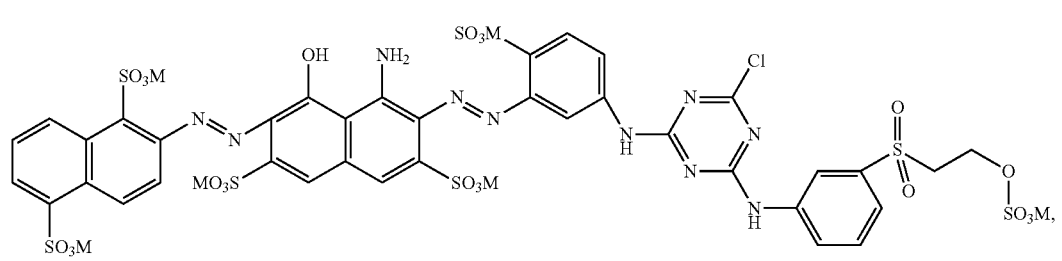

(I-2)

-continued
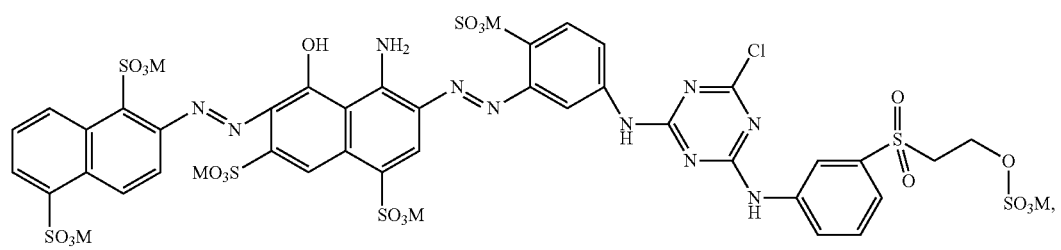
(I-3)
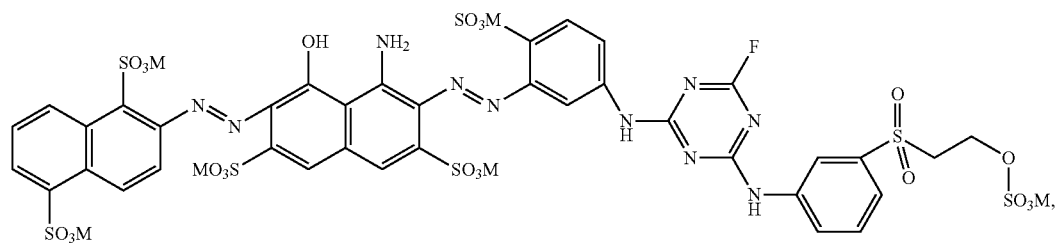
(I-4)
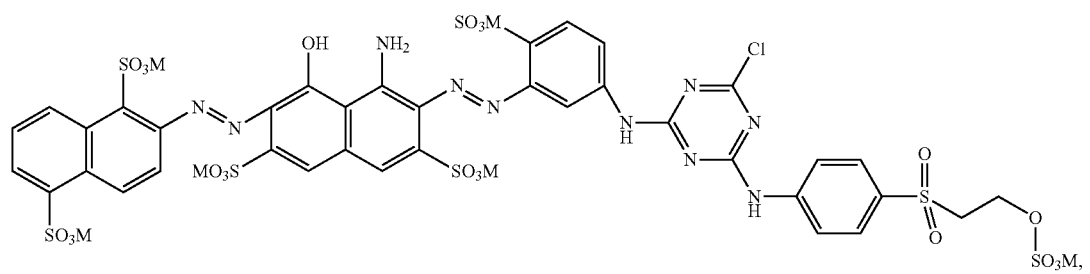
(I-5)
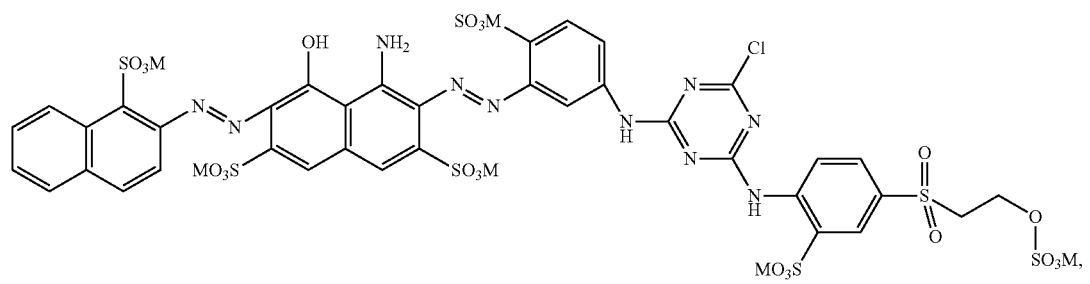
(I-6)
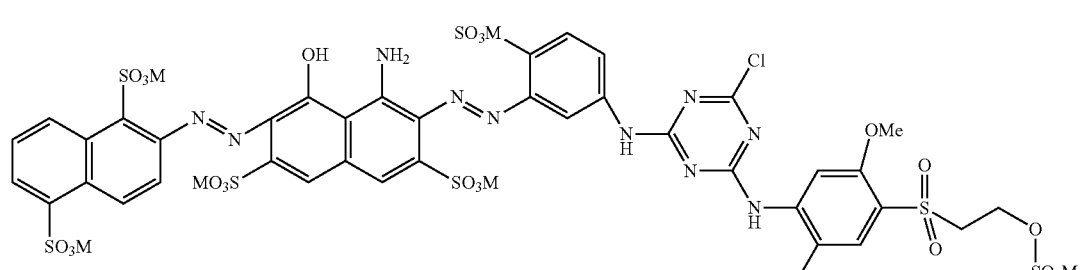
(I-7)
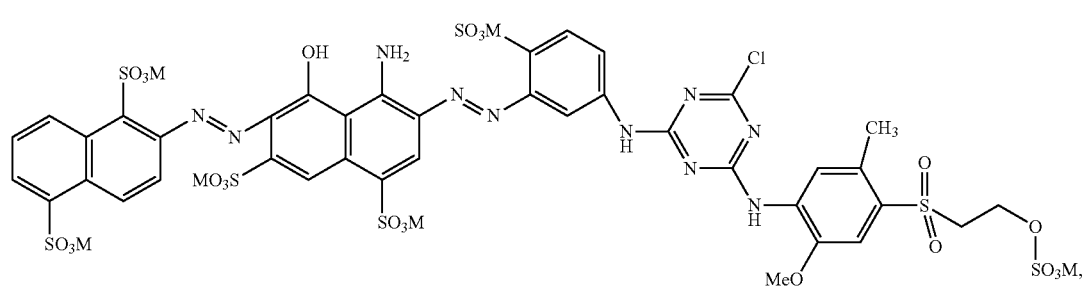
(I-8)

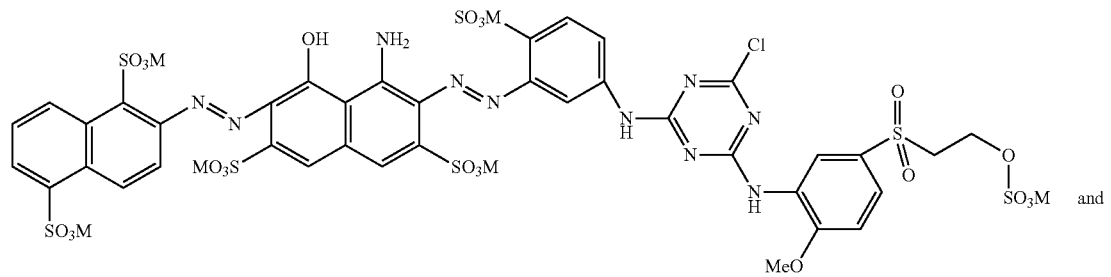

(I-9)

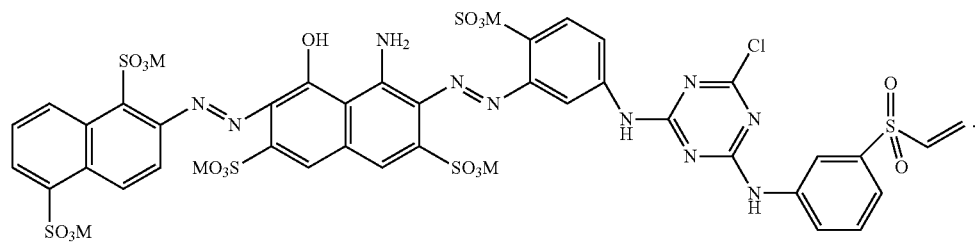

(I-10)

Another preferred aspect of the present invention is a dye mixture as described above comprising at least one dye of formula (IIa)

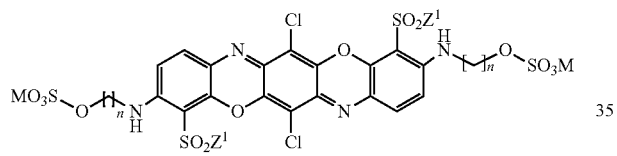

(IIa)

wherein
$Z^1$ is —CH=CH$_2$, —CH$_2$CH$_2$G or hydroxyl,
  wherein
  G is hydroxyl or an alkali-detachable group,
n is 2 or 3 and
M is hydrogen, an alkali metal or one equivalent of an alkaline earth metal.

More preferred is a dye mixture as described above, comprising at least one dye of formula (IIb)

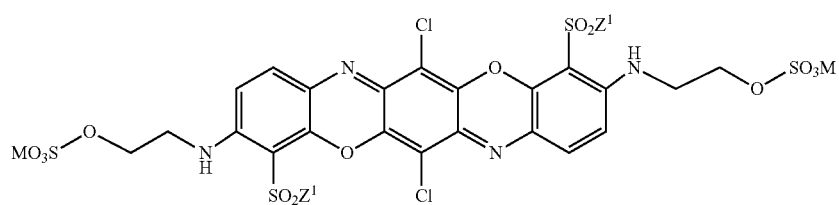

(IIb)

wherein
$Z^1$ is —CH=CH$_2$, —CH$_2$CH$_2$G or hydroxyl,
  wherein
  G is hydroxyl or an alkali-detachable group and
M is hydrogen, an alkali metal or one equivalent of an alkaline earth metal.

Even more preferred is a dye mixture as described above, comprising at least one dye selected from the group consisting of:

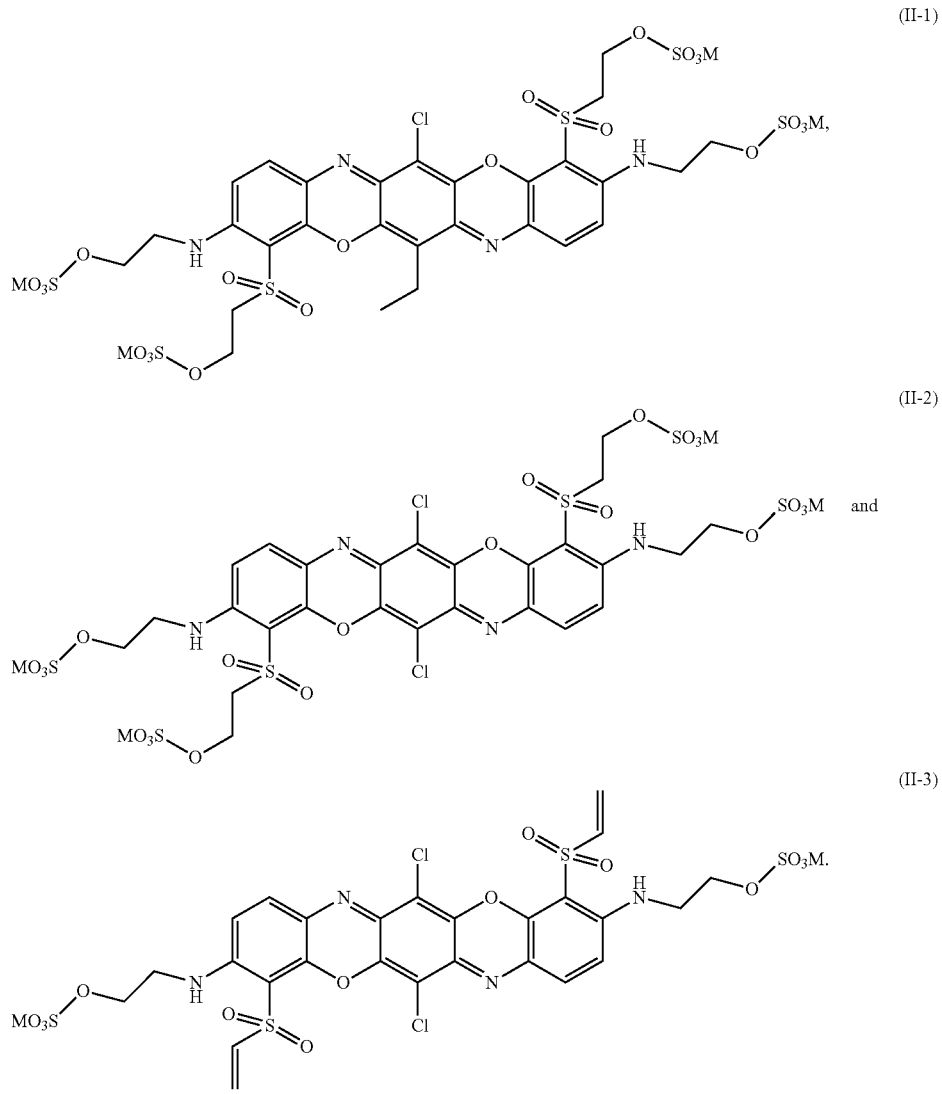

Accordingly, mixtures comprising the following combinations of dyes form preferred aspects of the present invention:

A mixture comprising at least one dye of formula (Ia) and at least one dye of formula (II).
A mixture comprising at least one dye of formula (Ib) and at least one dye of formula (II).
A mixture comprising at least one dye selected from the group consisting of dyes (I-1) to (I-10) and at least one dye of formula (II).
A mixture comprising at least one dye of formula (I) and at least one dye of formula (IIa).
A mixture comprising at least one dye of formula (I) and at least one dye of formula (IIb).
A mixture comprising at least one dye of formula (I) and at least one dye selected from the group consisting of dyes (II-1) to (II-10).

More preferred are mixtures of dyes, comprising
at least one dye of formula (Ia) and at least one dye of formula (IIa),
at least one dye of formula (Ib) and at least one dye of formula (IIa),
at least one dye selected from the group consisting of dyes (I-1) to (I-10) and at least one dye of formula (IIa)
at least one dye of formula (Ia) and at least one dye of formula (IIb),
at least one dye of formula (Ia) and one dye selected from the group consisting of dyes (II-1) to (I-3).

Even more preferred are mixtures of dyes, comprising
at least one dye of formula (Ib) and at least one dye of formula (IIB),
at least one dye selected from the group consisting of dyes (I-1) to (I-10) and at least one dye of formula (IIb)
at least one dye of formula (Ib) and one dye selected from the group consisting of dyes (II-1) to (I-3).

Most preferred is a dye mixture, comprising
at least one dye selected from the group consisting of dyes (I-1) to (I-10) and at least one dye selected from the group consisting of dyes (II-1) to (II-3).

Within this group of dye mixtures the following are preferred:

Mixtures comprising at least one dye selected from the group consisting of dyes (I-2), (I-5) and (I-10) with at least one dye selected from the group consisting of dyes (II-2), (II-3).

Particularly preferred are the following dye mixtures comprising dyes of formula:
(I-2) and (II-2),
(I-2) and (II-3),
(I-5) and (II-2),
(I-5) and (II-3),
(I-10) and (II-2) and
(I-10) and (II-3).

Also regarding the relative composition there exist preferred embodiments of the present invention:

Preferred are dye mixtures with a weight ratio of (I) 80 to 20% and (II) 20 to 80%. Even more preferred are dye mixtures with a weight ratio of (I) 70 to 30% and (II) 30 to 70%. In all cases adding up to 100% of the total amount of dyes present in the mixture, i.e. also additional dyes may be present in small amounts. Dye mixtures, wherein the dye portion consists of the dyes mentioned above are preferred.

($C_1$-$C_4$)-alkyl groups may be straight-chain or branched and are more particularly methyl, ethyl, n-propyl, isopropyl, n-butyl, isobutyl, sec-butyl or tert-butyl. Preference is given to methyl and ethyl. Similar selections apply to alkoxy, alkylmercapto, and sulfoalkyl, and also to alkylene groups.

M is preferably hydrogen, lithium, sodium or potassium, more preferably hydrogen or sodium.

Examples of alkali-detachable groups represented by G include halogen, such as chlorine and bromine; ester groups of organic carboxylic and sulfonic acids, such as alkylcarboxylic acids, unsubstituted or substituted benzenecarboxylic acids, and unsubstituted or substituted benzenesulfonic acids, such as the groups ($C_2$-$C_5$)-alkanoyloxy, including more particularly acetyloxy, benzoyloxy, sulfobenzoyloxy, phenylsulfonyloxy, and tolylsulfonyloxy; acidic ester groups of inorganic acids, such as of phosphoric acid, sulfuric acid, and thiosulfuric acid (phosphato, sulfato, and thiosulfato groups), or di-($C_1$-$C_4$)-alkylamino groups, such as dimethylamino and diethylamino. Preferably G is selected from the group consisting of —Cl, —Br, —F, —$OSO_3M$ and —$OPO_3M_2$. Most preferred G is —Cl or —$OSO_3M$.

$Z^1$ is preferably vinyl or β-chloroethyl and more preferably β-sulfatoethyl. $Z^1$ may be the same or different within the same molecule. It is preferred if they are the same.

The groups "sulfo", "carboxyl", "thiosulfato", "phosphato", and "sulfato" include not only their acid form but also their salt form. Accordingly, sulfo groups have the formula —$SO_3M$, thiosulfato groups have the formula —S—$SO_3M$, carboxyl groups have the formula —COOM, phosphato groups have the formula —$OPO_3M_2$, and sulfato groups have the formula —$OSO_3M$, in each of which M is defined as indicated above.

The mixtures of the dyes of formula (I) and formula (II) according to the present invention may be present as a preparation in solid or in liquid (dissolved) form. In solid form they comprise, to the extent necessary, the electrolyte salts which are customary for water-soluble and, in particular, fibre-reactive dyes, such as sodium chloride, potassium chloride and sodium sulfate, and may further comprise the auxiliaries that are customary in commercial dyes, such as buffer substances capable of setting a pH of between 3 and 7 in aqueous solution, such as sodium acetate, sodium citrate, sodium borate, sodium hydrogencarbonate, sodium dihydrogenphosphate and disodium hydrogenphosphate, and additionally dyeing auxiliaries, antidust agents, and small amounts of siccatives. If they are present in liquid, aqueous solution (including the content of thickeners of the kind customary for print pastes), they may also comprise substances which ensure a long life for these preparations, such as mold preventatives, for example.

In solid form, the mixtures of the dyes of formula (I) and formula (II) according to the invention are typically in the form of powders or granules which contain electrolyte salts (referred to generally, below, as preparations) with, where appropriate, one or more of the above mentioned auxiliaries. In the preparations the dyes are present at 20% to 90% by weight, based on the preparation. The buffer substances are generally present in a total amount of up to 5% by weight, based on the preparation.

Where the mixtures of the dyes of formula (I) and formula (II) according to the invention are present in aqueous solution, the total dye content of these aqueous solutions is up to about 50% by weight, such as, for example, between 5% and 40% by weight, the electrolyte salt content of these aqueous solutions being preferably below 10% by weight, based on the aqueous solution; the aqueous solutions (liquid preparations) may contain the aforementioned buffer substances in general in an amount of up to 5% by weight, preferably up to 2% by weight.

The mixtures of the dyes of formula (I) and Formula (II) according to the present invention can be isolated in conventional manner by being salted out, using common salt or potassium chloride, for example, or by spray drying or evaporation. An alternative option is to put the as-synthesized solutions, where necessary following addition of a buffer substance and if desired after concentration, to dyeing use directly, in the faun of liquid preparations.

The mixtures of dyes of formula (I) and (II) according to the present invention possess valuable performance properties and can be used for dyeing and printing carboxamido- and/or hydroxyl-containing materials or blend fabrics.

Preferred is the use of dye mixtures as described above for dyeing carboxamido-containing materials, especially for dyeing wool.

It is also possible to use the dye mixture as described above to print textiles or paper by the inkjet process.

The present invention accordingly also provides for the use of the dye mixtures as described above for dyeing or printing carboxamido- and/or hydroxyl-containing materials, and processes for dyeing or printing such materials in conventional procedures, by using the inventive dye mixture as colourant.

Fibres or fibre materials for the purposes of the present invention are more particularly textile fibres, which may he present as woven fabrics or as yams or in the form of hanks or wound packages.

Carboxamido-containing materials are, for example, synthetic and natural polyamides and polyurethanes, more particularly in the form of fibres, examples being wool and other animal hairs, silk, leather, nylon-6,6, nylon-6, nylon-11, and nylon-4.

Hydroxyl-containing materials are those of natural or synthetic origin, such as, for example, cellulose fibre materials or their regenerated products and polyvinyl alcohols. Cellulose fibre materials are preferably cotton, but also other plant fibres, such as linen, hemp, jute, and ramie fibres. Regenerated cellulose fibres are, for example, staple viscose and filament viscose.

The mixtures of the dyes having formula (I) and (II) according to the invention can be applied to and fixed on the stated materials, more particularly the stated fibre materials, by the application techniques that are known for water-soluble dyes, and particularly for fibre-reactive dyes.

Wool which has been given a nonfelting or low-felting finish (cf, for example, H. Rath, Lehrbuch der Textilchemie, Springer-Verlag, 3rd edition (1972), pp. 295 to 299, especially wool finished by the Hercosett process (p. 298); J. Soc. Dyers and Colourists 1972, 93 to 99, and 1975, 33 to 44) can be dyed with very good fastness properties. The process of dyeing on wool takes place here in a conventional dyeing procedure from an acidic medium.

A suitable organic acid, for example, acetic acid can be added to the dyebath in order to obtain the desired pH.

For example, acetic acid and/or ammonium sulfate or acetic acid and ammonium acetate or sodium acetate can be added to the dye-bath in order to obtain the desired pH. To achieve a useful levelness in the dyeing, it is advisable to add customary levelling assistants, such as, for example, a levelling assistant based on a reaction product of cyanuric chloride with three times the molar amount of aminobenzenesulfonic acid and/or of an aminonaphthalenesulfonic acid, or one based on a reaction product of, for example, stearylamine with ethylene oxide. Thus, for example, the dye mixture of the invention preferably is first subjected to the exhaust process from a dyebath having a pH of about 3.5 to 7.0, with monitoring of the pH. Following the dyeing, the pH is adjusted to the weakly alkaline range, to a pH of up to 8.5, in order to remove the fraction of dye which has not been reactively bound. In industrial practice, the wool may be in various forms such as loose fiber, tops, yarn and woven or knitted fabric. Typical liquor:material ratios in dyeing are in the range 4:1 up to 50:1, and dyeing temperatures in the range 90 to 110° C.

The procedure described here also applies to the production of dyeings on fibre materials composed of other natural polyamides or of synthetic polyamides and polyurethanes. These materials can be dyed using the customary dyeing and printing processes that are described in the literature and known to the person skilled in the art (see, for example, H.-K. Rouette, Handbuch der Textilveredlung, Deutscher Fachverlag GmbH, Frankfurt am Main).

Besides mixtures of dyes of formula (I) and (II) with water, the dyeing liquors and print pastes may comprise further additives. Additives are, for example, wetting agents, antifoams, leveling agents, and agents that influence the properties of the textile material, such as softeners, flame retardant finish additives, and agents which impart dirt, water, and oil repellency or that soften water. Print pastes in particular may also comprise natural or synthetic thickeners, such as alginates and cellulose ethers, for example. In the dyebaths and print pastes, the amounts of dye may vary within wide limits, in accordance with the desired depth of colour. Generally speaking, the mixtures of dyes of formula (I) and (II) is present in amounts of 0.01% to 15% by weight, more particularly in amounts of 0.1% to 10% by weight, based on the dyeing goods or the print paste, respectively.

On cellulose fibres, dyeings having very good colour yields are obtained by the exhaust processes from a long liquor, using a wide variety of acid-binding agents and, where appropriate, neutral salts, such as sodium chloride or sodium sulfate. In the case of the exhaust process it is preferred to carry out dyeing at a pH of 3 to 7, more particularly at a pH of 4 to 6. The liquor ratio may be selected within a wide range and is for example between 3:1 and 50:1, preferably between 5:1 and 30:1. Dyeing is done preferably in an aqueous bath at temperatures between 40 and 105° C., optionally at a temperature up to 130° C. under superatmospheric pressure, and where appropriate in the presence of customary dyeing auxiliaries. The wet fastness properties of the dyed material can be enhanced by an aftertreatment to remove unfixed dye. This aftertreatment takes place more particularly at a pH of 8 to 9 and at temperatures of 75 to 80° C.

One possible exhaust process procedure is to introduce the material into the warm bath and to gradually heat the bath to the desired temperature and complete the dyeing operation. The neutral salts which accelerate the exhaustion of the dyes can also, if desired, not be added to the bath until the actual dyeing temperature has been reached.

The padding process on cellulose fibres likewise produces excellent colour yields and a very good colour build-up, with fixing able to take place in conventional manner by batching at room temperature or elevated temperature, at up to about 60° C., for example, by steaming or by means of dry heat.

The customary printing processes for cellulose fibres as well, which can be carried out in one step—as for example by printing with a print paste comprising sodium bicarbonate or another acid-binding agent and by subsequent steaming at 100 to 103° C.—or in two steps—as for example by printing with a neutral or weakly acidic printing ink, followed by fixing either by passage of the printed materials through a hot, electrolyte-containing alkaline bath or by overpadding with an alkaline, electrolyte-containing padding liquor, and subsequent batching or steaming or dry heat treatment of the alkali-overpadded material—produces strongly coloured prints with well-defined contours and a clear white ground. The outcome of the prints is affected little, if at all, by variations in the fixing conditions.

In the case of fixing by means of dry heat, in accordance with the customary thermofix processes, hot air at 120 to 200° C. is used. Besides the customary steam at 101 to 103° C., it is also possible to use superheated steam and high-pressure steam at temperatures of up to 160° C.

The acid-binding agents which effect the fixation of the dyes on the cellulose fibres are, for example, water-soluble basic salts of the alkali metals and likewise alkaline earth metals of organic or inorganic acids or compounds which liberate alkali in the heat. Particularly included are the alkali metal hydroxides and alkali metal salts of weak to moderately strong organic or inorganic acids, the preferred alkali metal compounds being the sodium compounds and potassium compounds. Examples of such acid-binding agents include sodium hydroxide, potassium hydroxide, sodium carbonate, sodium bicarbonate, potassium carbonate, sodium formate, sodium dihydrogenphosphate, disodium hydrogenphosphate, sodium trichloroacetate, waterglass or trisodium phosphate, or mixtures thereof.

The mixtures of dyes of formula (I) and (II) according the invention are notable in particular for high colour strengths and fixing yields and ease of wash-off of the portions not fixed on the fibre. Moreover, the dyeings and prints have good all-round fastness properties, such as high light fastness and very good wet fastnesses, such as fastness to washing, to water, to salt water, to cross-dyeing, and to perspiration, for example, and also good fastness to pleating, hot pressing, and rubbing. They exhibit, furthermore the same level of fastness especially in Potting (ISO 105-E09) and Cross-dyeing (ISO 105-X07) as the corresponding Mordant dyes (after chrome dyes).

The present invention also provides inks for digital textile printing by the inkjet process, which comprise a mixture of the dyes of formula (I) and formula (II) according to the invention.

The inks of the invention comprise mixtures of the dyes of formula (I) and formula (II) according to the invention, in amounts, for example, of 0.1% to 50% by weight, preferably in amounts of 1% to 30% by weight, and more preferably in amounts of 1% to 15% by weight, based on the total weight of the ink. It will be appreciated that the inks may also comprise mixtures of the dyes of the formula (I) und Formula (II) according to the invention and other dyes used in textile printing.

For the use of the inks in the continuous flow process, a conductivity of 0.5 to 25 mS/m can be set by addition of electrolyte. Examples of suitable electrolyte include lithium nitrate and potassium nitrate.

The inks of the invention may contain organic solvents with a total content of 1 to 50%, preferably of 5 to 30% by weight.

Examples of suitable organic solvents include alcohols, such as methanol, ethanol, 1-propanol, isopropanol, 1-butanol, tert-butanol, pentyl alcohol, polyhydric alcohols, such as 1,2-ethanediol, 1,2,3-propanetriol, butanediol, 1,3-butanediol, 1,4-butanediol, 1,2-propanediol, 1,3-propanediol, pentanediol, 1,4-pentanediol, 1,5-pentanediol, hexanediol, D,L-1,2-hexanediol, 1,6-hexanediol, 1,2,6-hexarietriol, 1,2-octanediol, polyalkylene glycols, such as polyethylene glycol, polypropylene glycol, alkylene glycols having 2 to 8 alkylene groups, e.g.: monoethylene glycol, diethylene glycol, triethylene glycol, tetraethylene glycol, thioglycol, thiodiglycol, butyltriglycol, hexylene glycol, propylene glycol, dipropylene glycol, tripropylene glycol, lower alkyl ethers of polyhydric alcohols, such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol monohexyl ether, triethylene glycol monomethyl ether, triethylene glycol monobutyl ether, tripropylene glycol monomethyl ether, tetraethylene glycol monomethyl ether, tetraethylene glycol monobutyl ether, tetraethylene glycol dimethyl ether, propylene glycol monomethyl ether, propylene glycol monoethyl ether, propylene glycol monobutyl ether, tripropylene glycol isopropyl ether, polyalkylene glycol ethers, such as polyethylene glycol monomethyl ether, polypropylene glycol glycerol ether, polyethylene glycol tridecyl ether, and polyethylene glycol nonylphenyl ether, amines, such as methylamine, ethylamine, diethylamine, triethylamine, diethylamine, dimethylamine, trimethylamine, dibutylamine, diethanolamine, triethanolamine, ethylenediamine, urea derivatives, such as urea, thiourea, N-methylurea, N,N'-dimethylurea, ethyleneurea, and 1,1,3,3-tetramethylurea, amides, such as dimethylformamide, dimethylacetamide, acetamide, N-formylethanolamine, N-acetylethanolamine, ketones or keto alcohols, such as acetone, diacetone alcohol, cyclic ethers, such as tetrahydrofuran, dioxane, and also trimethylolethane, trimethylolpropane, 2-butoxyethanol, benzyl alcohol, gamma-butyrolactone, epsilon-caprolactam, and additionally sulfolane, methylsulfolane, 2,4-dimethylsulfolane, dimethyl sulfone, butadiene sulfone, dimethyl sulfoxide, dibutyl sulfoxide, N-cyclohexylpyrrolidone, N-methyl-2-pyrrolidone, N-ethylpyrrolidone, 2-pyrrolidone, 1-(2-hydroxyethyl)-2-pyrrolidone, 1-(3-hydroxypropyl)-2-pyrrolidone, 1,3-dimethyl-2-imidazolidinone, 1,3-dimethyl-2-imidazolidinone, 1,3-bismethoxy methylimidazolidine, 2-(2-methoxyethoxy)ethanol, 2-(2-ethoxyethoxy)ethanol, 2-(2-butoxy-ethoxy) ethanol, 2-(2-propoxyethoxy)ethanol, 1,2-dimethoxypropane, trimethoxypropane, pyridine, piperidine, ethyl acetate, ethylenediaminetetraacetate, and ethyl pentyl ether.

The inks of the invention may further comprise the customary additives, such as, for example, viscosity moderators to set viscosities in the range from 1.5 to 40.0 mPas in a temperature range from 20 to 50° C. Preferred inks have a viscosity of 1.5 to 20 mPas, and particularly preferred inks have a viscosity of 1.5 to 15 mPas.

Suitable viscosity moderators are rheological additives, examples being the following: polyvinylcaprolactam, polyvinylpyrrolidone, and also their copolymers, polyetherpolyol, associative thickeners, polyurea, polyurethane, sodium alginates, modified galactomannans, polyetherurea, polyurethane, and nonionic cellulose ethers.

As further additives the inks of the invention may include surface-active substances for setting surface tensions of 20 to 65 mN/m, which are adapted if necessary as a function of the process used (thermo or piezoelectric technology).

Examples of suitable surface-active substances include the following: surfactants of all kinds, preferably nonionic surfactants, butyldiglycol, and 1,2-hexanediol.

The inks may further comprise customary additives, such as substances for inhibiting fungal and bacterial growth, for example, in amounts of 0.01% to 1% by weight, based on the total weight of the ink.

The inks of the invention may be prepared in conventional manner by mixing of the components in water.

The inks of the invention are suitable for use in inkjet printing processes for printing a very wide variety of pretreated materials, such as silk, leather, wool, polyamide fibres and polyurethanes, and more particularly cellulosic fibre materials of all kinds. The printing inks of the invention are also suitable for printing pretreated hydroxyl- and/or amino-containing fibres that are present in blend fabrics; for example, mixtures of cotton, silk, wool with polyester fibres or polyamide fibres.

In contrast to conventional textile printing, where the printing ink already contains all of the fixing chemicals and thickeners for a reactive dye, it is necessary in the case of inkjet printing to apply the auxiliaries to the textile substrate in a separate pretreatment step.

The pretreatment of the textile substrate, such as, for example, cellulose fibres and regenerated cellulose fibres, and also silk and wool, takes place with an aqueous alkaline liquor prior to printing. Fixing reactive dyes requires alkali, for example sodium carbonate, sodium bicarbonate, sodium acetate, trisodium phosphate, sodium silicate, sodium hydroxide, alkali donors such as, for example, sodium chloroacetate, sodium formate, hydrotropic substances such as, for example, urea, reduction inhibitors, such as, for example, sodium nitrobenzenesulfonates, and also thickeners to prevent flowing of the motifs when the printing ink is applied, examples thereof being sodium alginates, modified polyacrylates or highly etherified galactomannans.

These pretreatment reagents are applied uniformly to the textile substrate in a defined amount, using suitable applicators, as for example with a 2- or 3-roll pad mangle, by contactless spraying technologies, by means of foam application, or with appropriately adapted inkjet technologies, and are subsequently dried.

After printing has taken place, the textile fibre material is dried at 120 to 150° C. and then fixed. Fixing the inkjet prints produced with reactive dyes can be accomplished at room temperature, or with saturated steam, with superheated steam, with hot air, with microwaves, with infrared radiation, with laser beams or electron beams, or with other suitable energy transfer techniques. A distinction is made between one- and two-phase fixing operations. In one-phase fixing, the chemicals needed for fixing are already on the textile substrate. In two-phase fixing, this pretreatment is unnecessary. Fixing requires only alkali, which, following inkjet printing, is applied prior to the fixing operation, without drying in between. Further additives such as urea or thickeners are redundant.

Following the fixing operation, the print is aftertreated, which is a prerequisite for good fastness properties, high brilliance, and an impeccable white ground.

The prints produced with the inks of the invention possess high colour strength and a high fibre-dye bond stability, not only in the acidic range but also in the alkaline range, and also have good light fastness and very good wet fastness properties, such as fastness to washing, water, salt water, cross-dyeing, and perspiration, and also good fastness to pleating, hot pressing, and rubbing.

The inventive mixtures of dyes of the formula (I) and (II) furnish blue/navy-dyeings and prints, and inkjet prints, on the materials specified.

The examples hereinbelow serve to illustrate the invention. The parts are parts by weight and the percentages are percent by weight, unless noted otherwise. The relationship between parts by weight and parts by volume is that of the kilogram to the liter. The compounds described by formula in the examples are written in the form of the sodium salts, since in general they are prepared and isolated in the form of their salts, preferably sodium salts or potassium salts, and used for dyeing in the form of their salts. The starting compounds specified in the examples below, especially the tabular examples, can be used in the synthesis in the form of the free acid or likewise in the form of their salts, preferably alkali metal salts, such as sodium salts or potassium salts.

The single dyes are long known: Dyes of formula (II) can be prepared as is outlined in EP 0 141 996 and the preparation of dyes of formula (I) is described in Dyes and Pigments 1982, 3, 281; Textile Chem. Color. 1991, 2 (12), 19; Dyes and Pigments 1985, 29, 1.

The dye-mixtures were then prepared as in the following examples.

EXAMPLE 1

70 parts of an electrolyte-containing dye powder containing the navy azo dye of formula (I-2) in a 75% fraction (i.e. having a dye content of 75%), and 30 parts of an electrolyte-containing dye powder containing the bright blue triphendioxazine dye of formula (II-2) in an 80% fraction, were mixed mechanically with one another.

The resultant inventive dye mixture provides navy dyeings on wool, under the dyeing conditions customary for reactive dyes.

EXAMPLE 2

50 parts of an electrolyte-containing dye powder containing the navy azo dye of formula (I-2) in a 75% fraction, and 50 parts of an electrolyte-containing dye powder containing the blue triphendioxazine dye of formula (II-2) in an 80% fraction were mixed mechanically with one another.

The resultant inventive dye mixture provides reddish navy dyeings on wool under the dyeing conditions customary for reactive dyes.

| Example No. | Component 1 | % (pure dye) | Component 2 | % (pure dye) |
|---|---|---|---|---|
| 3 | I-2 | 65 | II-2 | 35 |
| 4 | I-2 | 80 | II-2 | 20 |
| 5 | I-2 | 30 | II-2 | 70 |
| 6 | I-2 | 60 | II-3 | 40 |
| 7 | I-2 | 65 | II-1 | 35 |
| 8 | I-5 | 50 | II-1 | 50 |
| 9 | I-5 | 65 | II-2 | 35 |
| 10 | I-5 | 80 | II-3 | 20 |
| 11 | I-10 | 60 | II-1 | 40 |
| 12 | I-10 | 60 | II-2 | 40 |
| 13 | I-10 | 60 | II-3 | 40 |
| 14 | I-1 | 50 | II-1 | 50 |
| 15 | I-1 | 70 | II-2 | 30 |
| 16 | I-1 | 60 | II-3 | 40 |
| 17 | I-3 | 55 | II-1 | 45 |
| 18 | I-3 | 65 | II-2 | 35 |
| 19 | I-3 | 70 | II-3 | 30 |
| 20 | I-4 | 80 | II-1 | 20 |
| 21 | I-4 | 60 | II-2 | 40 |
| 22 | I-4 | 60 | II-3 | 40 |
| 23 | I-5 | 70 | II-1 | 30 |
| 24 | I-5 | 50 | II-2 | 50 |
| 25 | I-5 | 60 | II-3 | 40 |
| 26 | I-6 | 75 | II-1 | 25 |
| 27 | I-6 | 50 | II-2 | 50 |
| 28 | I-6 | 40 | II-3 | 60 |
| 29 | I-7 | 70 | II-1 | 30 |
| 30 | I-7 | 65 | II-2 | 35 |
| 31 | I-7 | 55 | II-3 | 45 |
| 32 | I-8 | 80 | II-1 | 20 |
| 33 | I-8 | 80 | II-2 | 20 |
| 34 | I-8 | 75 | II-3 | 25 |
| 35 | I-9 | 50 | II-1 | 50 |
| 36 | I-9 | 45 | II-2 | 55 |
| 37 | I-9 | 60 | II-3 | 40 |
| 38 | I-9 | 20 | II-3 | 80 |

EXAMPLES 39 TO 42 DYEING AND BLEACH TESTS

Inventive mixtures of dyes as well as mixtures based on known mixtures were dyed on cotton and the retention of depths after bleach treatment was measured.

| Recipe | C.I. Reactive Black 5 | Structure I-2 | Structure II-2 |
|---|---|---|---|
| 39 | 0.66 | | 0.34 |
| 40 | | 0.66 | 0.34 |
| 41 | 0.38 | | 0.62 |
| 42 | | 0.38 | 0.62 |

C.I. Reactive Black 5 has the following structure:

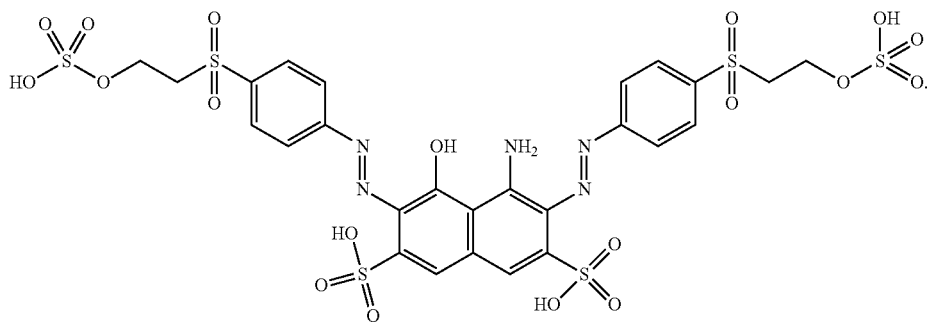 [SMILES: Nc1c(/N=N/c2ccc(S(=O)(=O)CCOS(=O)(=O)O)cc2)c(S(=O)(=O)O)cc2cc(S(=O)(=O)O)c(/N=N/c3ccc(S(=O)(=O)CCOS(=O)(=O)O)cc3)c(O)c12]

The mixtures were dyed on a 100% cotton interlock substrate at a liquor ratio of 10:1 and at a temperature of 60° C. All recipes included 25 g/l common salt and 5 g/l soda ash. The substrate was subsequently rinsed, soaped and dried. The measurement of dyeing yield was done by spectrophotometer.

After treatment with oxidizing agents the following data was obtained:

| Recipe | Integ of original | Hypochlorite bleach DIN 54034 | ISO 105-E03 20 mg chlorine |
|---|---|---|---|
| 39 | 12.81 | 2.95 | 4.92 |
| 40 | 8.46 | 5.96 | 5.70 |
| 41 | 11.77 | 4.23 | 4.36 |
| 42 | 8.85 | 6.30 | 4.70 |

This translates into the following Retention of depth of dyeing after treatment with oxidizing agents

| Recipe | Original | Hypochlorite bleach mild DIN 54034 | ISO 105-E03 20 mg/l active chlorine |
|---|---|---|---|
| 39 | 100% | 23% | 38% |
| 40 | 100% | 70% | 67% |
| 41 | 100% | 36% | 37% |
| 42 | 100% | 71% | 53% |

It can thus be summarized that the stability of the dye mixture according to the present invention (Examples 40 and 42) against oxidizing agents is significantly better than the stability of a comparative mixture of reactive dyes (Examples 39 and 41). It goes without saying that the absence of heavy metals is the other mayor advantage of the inventive dye mixtures shown above as compared to mordant type dyes.

The invention claimed is:

1. A dye mixture comprising at least one dye of formula (I)

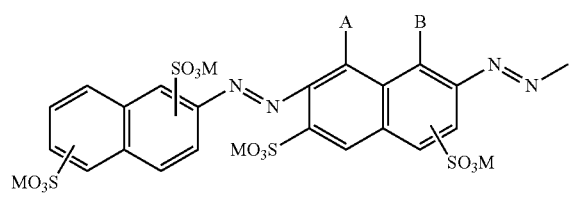

(I)

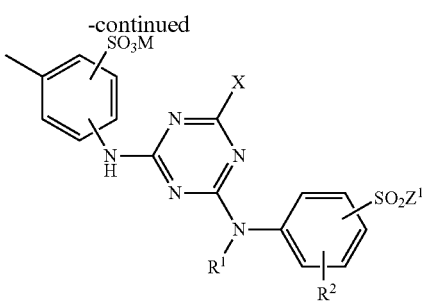

and at least one dye (II) selected from the group consisting of:

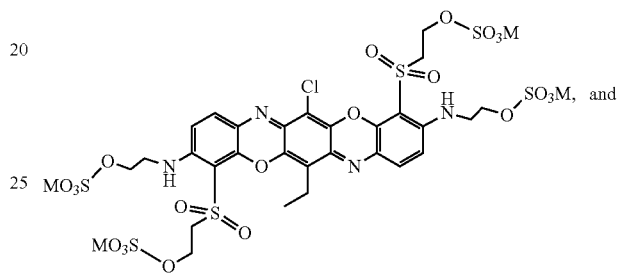

(II-1)

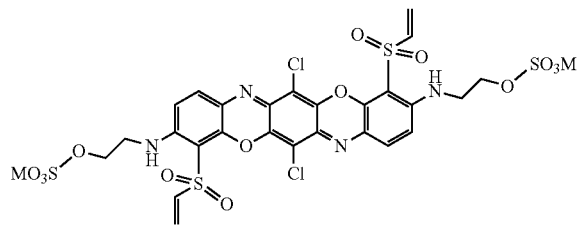

(II-3)

wherein independent of each other
A is OH and B is $NH_2$ or A is $NH_2$ and B is OH,
D is $(C_1$-$C_4)$-alkyl or Cl,
$R^1$ is hydrogen or $(C_1$-$C_4)$-alkyl,
$R^2$ is hydrogen, $(C_1$-$C_4)$-alkyl, $(C_1$-$C_4)$-alkoxy or sulfo,
$Z^1$ is —CH=$CH_2$, —$CH_2CH_2$G or hydroxyl,
  wherein
  G is hydroxyl; halogen; ester groups of organic carboxylic and sulfonic acids;
  or acidic ester groups of inorganic acids;
X is Cl or F,
and
M is hydrogen, an alkali metal or one equivalent of an alkaline earth metal and.

2. The dye mixture according to claim 1, comprising at least one dye of formula (Ia)

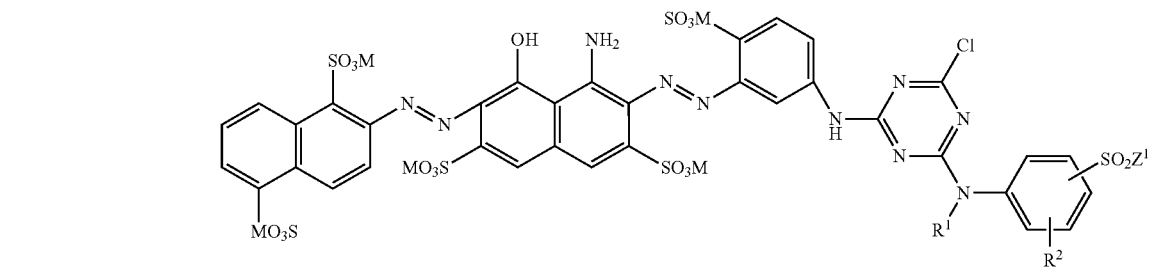

(Ia)

wherein
R¹ is hydrogen, methyl or ethyl,
R² is hydrogen, $(C_1$-$C_2)$-alkyl, $(C_1$-$C_2)$-alkoxy or sulfo,
Z¹ is —CH=CH₂, —CH₂CH₂G or hydroxyl,
    wherein
    G is hydroxyl; halogen; ester groups of organic carboxylic and sulfonic acids;
    or acidic ester groups of inorganic acids;
and
M is hydrogen, an alkali metal or one equivalent of an alkaline earth metal.

3. The dye mixture according to claim 1 comprising at least one dye of formula (Ib)

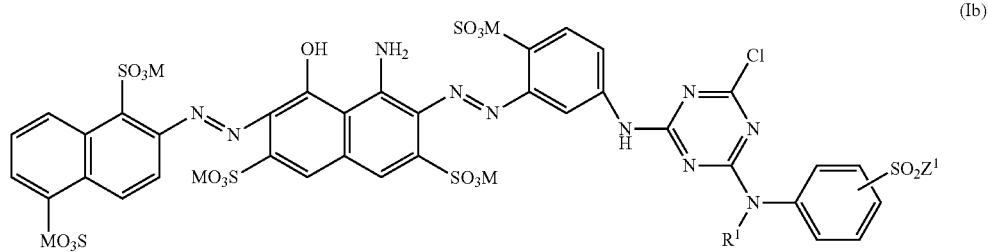

wherein
R¹ is hydrogen, methyl or ethyl,
Z¹ is —CH=CH₂, —CH₂CH₂G or hydroxyl,
    wherein
    G is hydroxyl; halogen; ester groups of organic carboxylic and sulfonic acids;
    or acidic ester groups of inorganic acids;
and
M is hydrogen, an alkali metal or one equivalent of an alkaline earth metal.

4. The dye mixture according to claim 1, comprising at least one dye selected from the group consisting of:

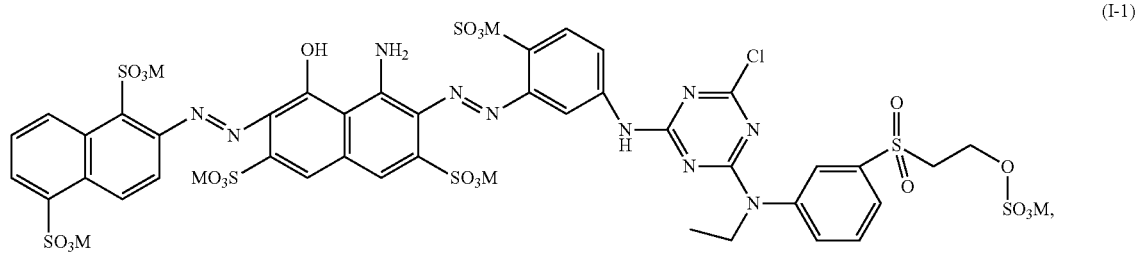

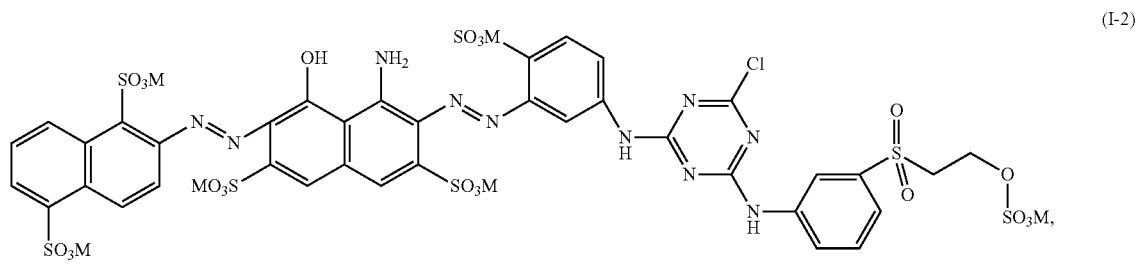

-continued
(I-3)
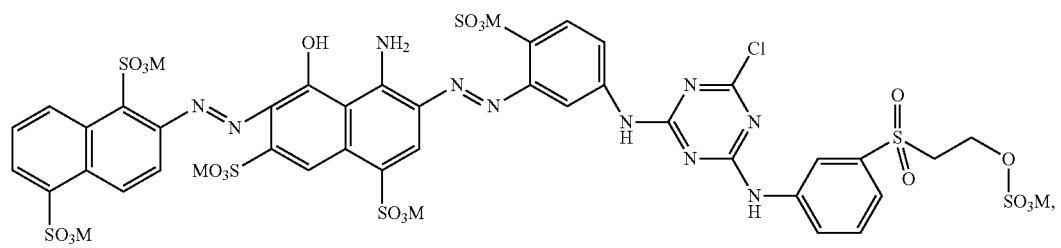
(I-4)
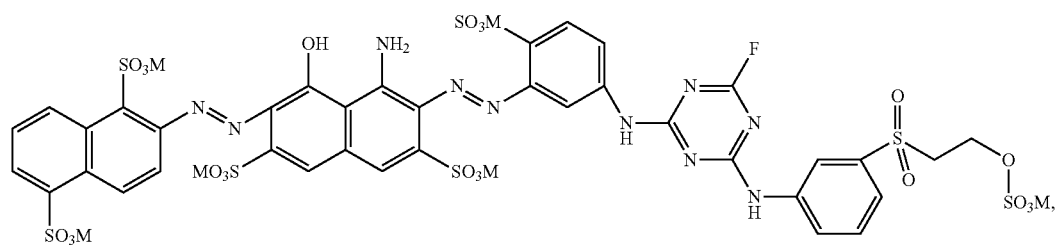
(I-5)
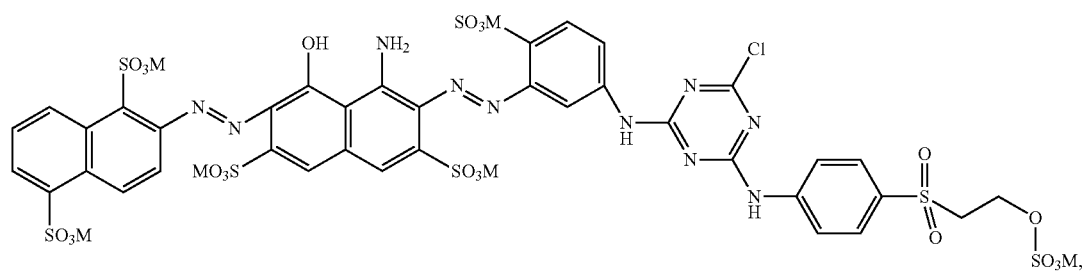
(I-6)
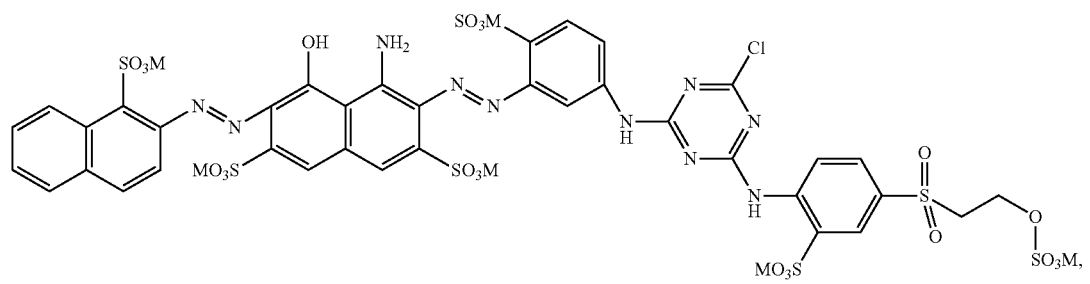
(I-7)
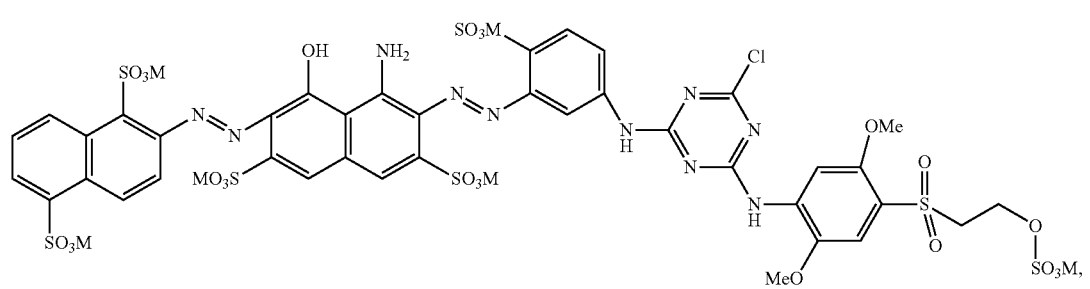
(I-8)
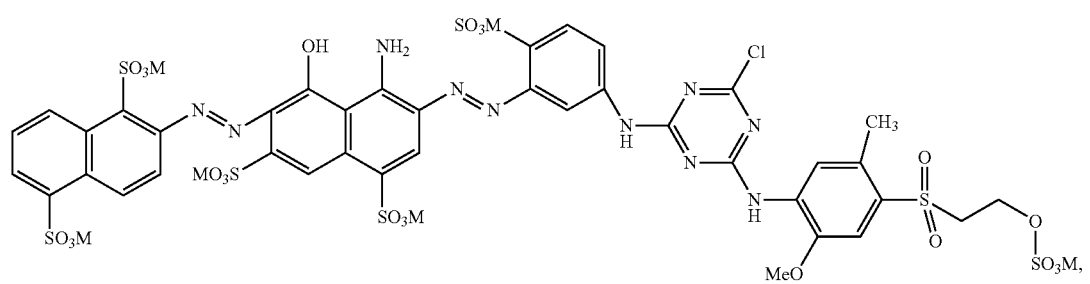

-continued
(I-9)
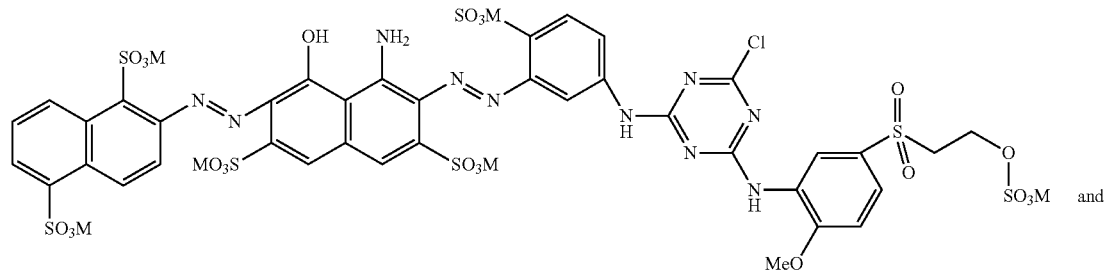
(I-10)
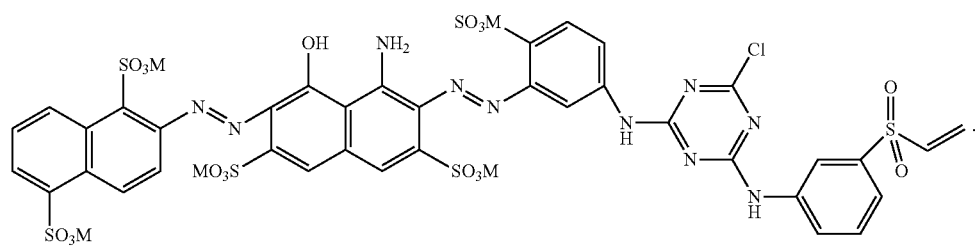
5. The dye mixture according to claim 1, with a weight ratio of (I) 80 to 20% and (II) 20 to 80%.
6. The dye mixture according to claim 5, with a weight ratio of (I) 70 to 30% and (II) 30 to 70%.
7. A process for dyeing a carboxamido-containing material which comprises contacting the material with a dye mixture comprising at least one dye of formula (I)
(I)
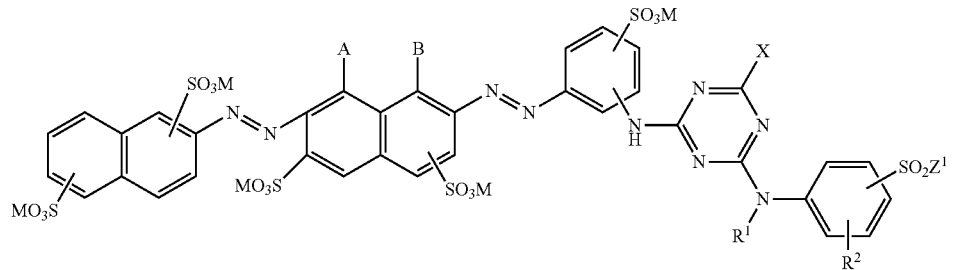
and at least one dye of formula (II)
(II)
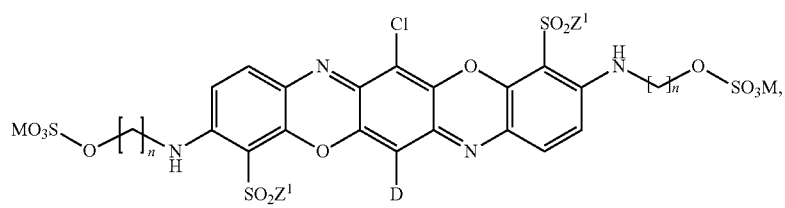

wherein independent of each other

A is OH and B is $NH_2$ or A is $NH_2$ and B is OH,

D is $(C-C_4)$-alkyl or Cl, $R^1$ is hydrogen or $(C_1-C_4)$-alkyl, $R^2$ is hydrogen, $(C_1-C_4)$-alkyl, $(C_1-C_4)$-alkoxy or sulfo, $Z^1$ is $-CH=CH_2$, $-CH_2CH_2G$ or hydroxyl, wherein G is hydroxyl; halogen; ester groups of organic carboxylic and sulfonic acids;

or acidic ester groups of inorganic acids;

X is Cl or F, n is 2 or 3 and

M is hydrogen, an alkali metal or one equivalent of an alkaline earth metal and with the proviso that formula (II) is not of the formula (II-2)

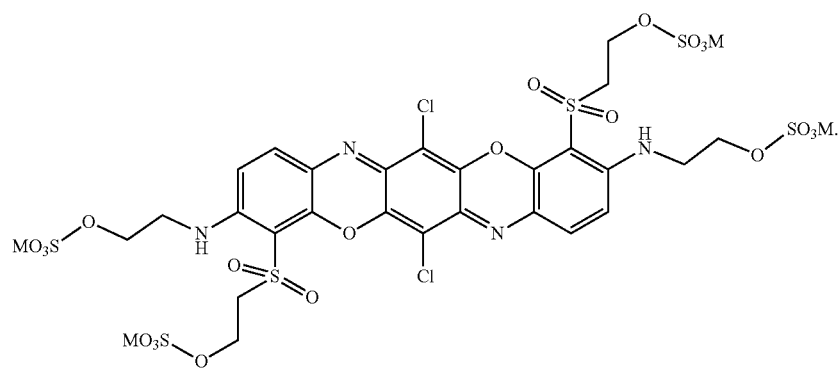

8. The process as claimed in claim 7, wherein in the material is wool.

9. A dye mixture comprising at least one dye of formula (I) which is selected from the group consisting of (I-1)-(I-10)

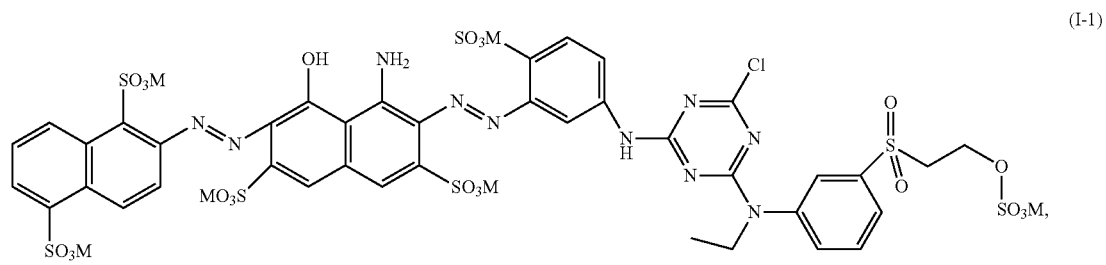

(I-1)

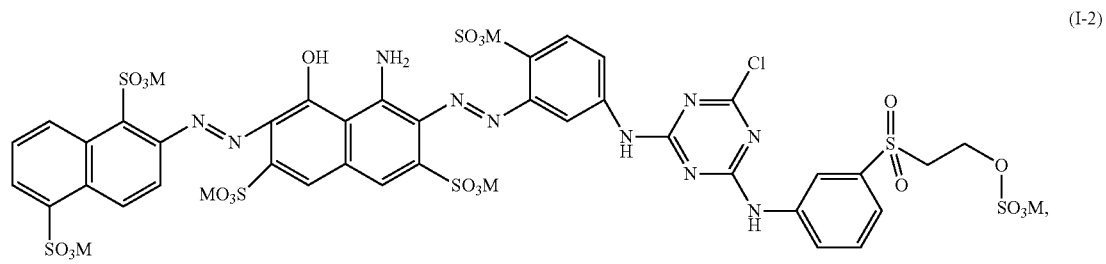

(I-2)

-continued
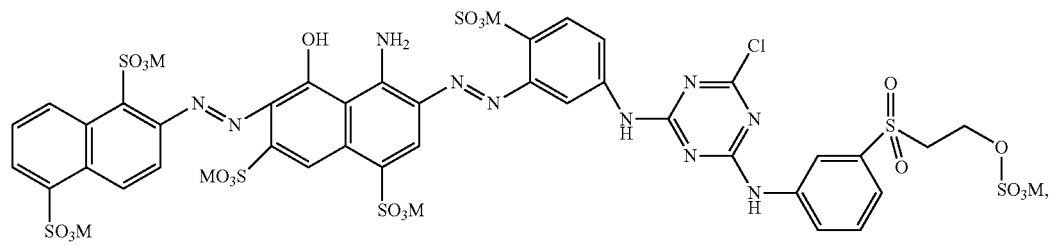
(I-3)
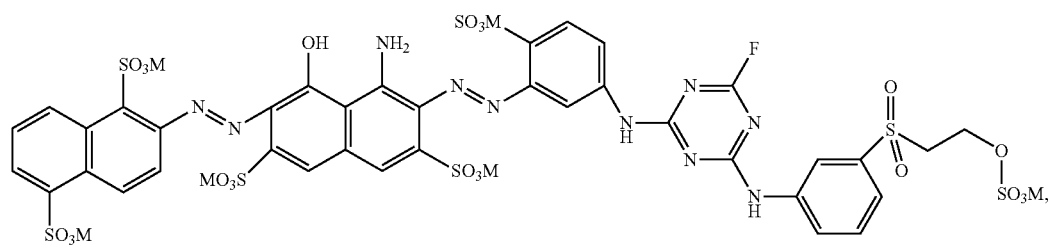
(I-4)
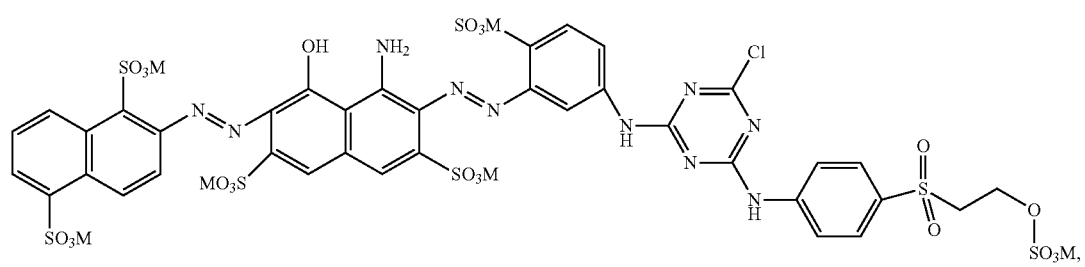
(I-5)
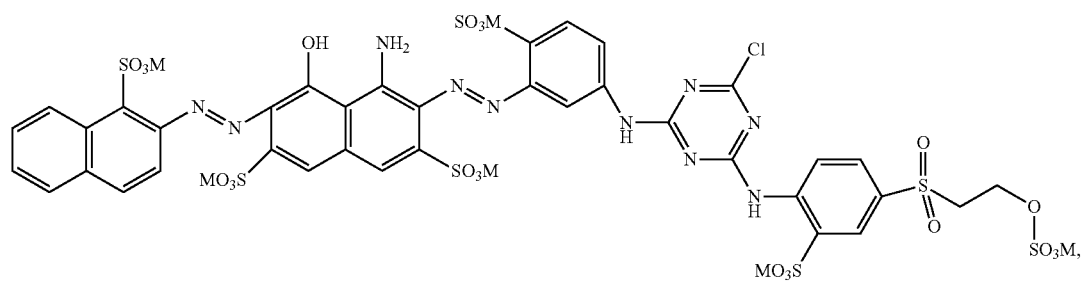
(I-6)
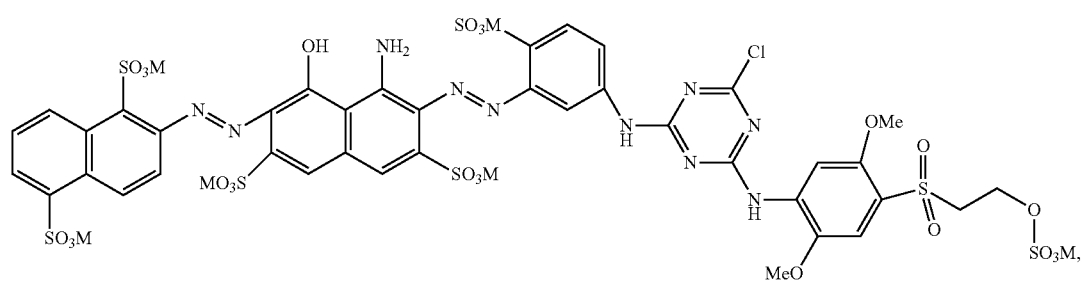
(I-7)
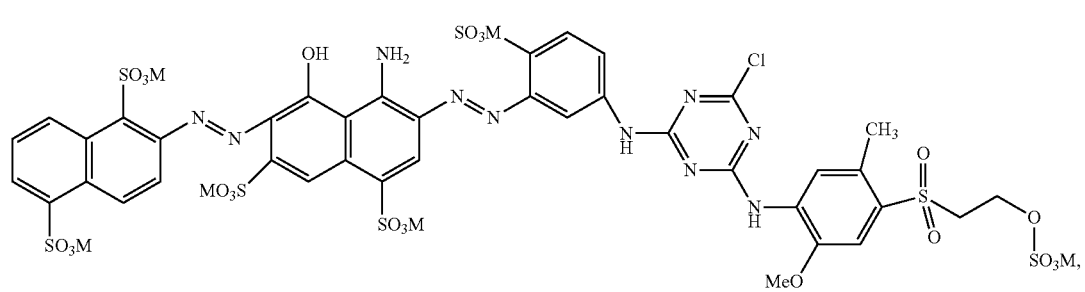
(I-8)

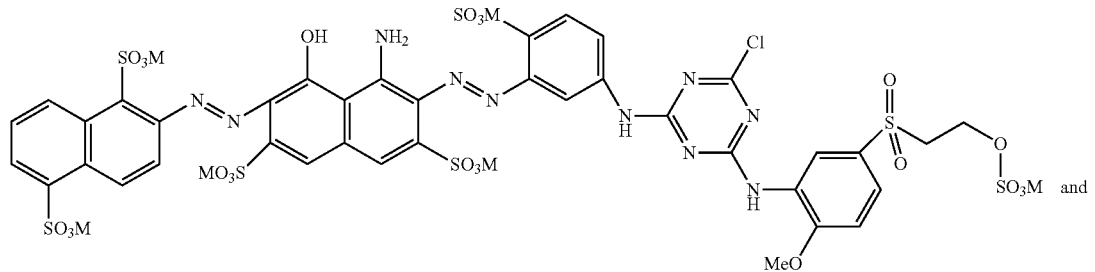
(I-9)
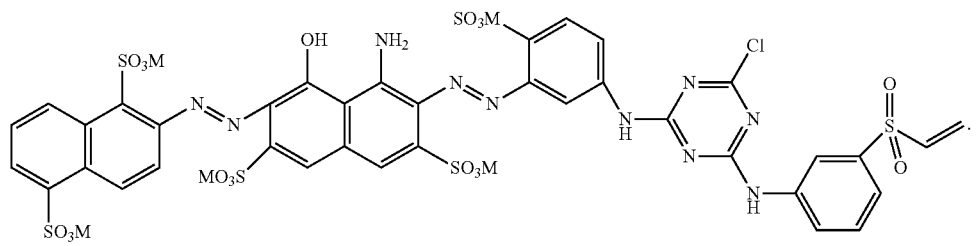
(I-10)
and at least one dye of formula (II) which is selected from the group consisting of (II-1), (II-2) and (II-3)
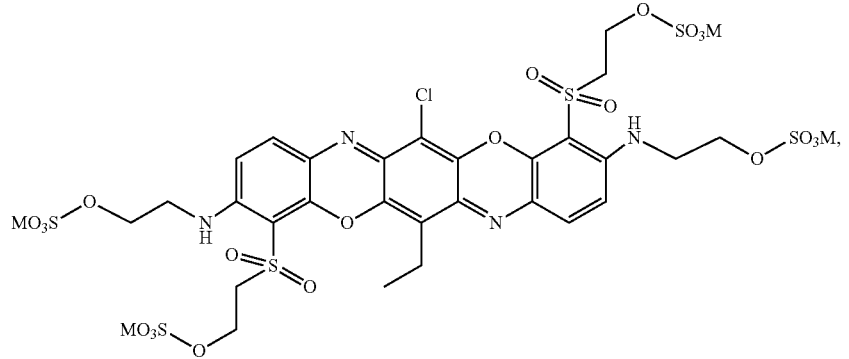
(II-1)
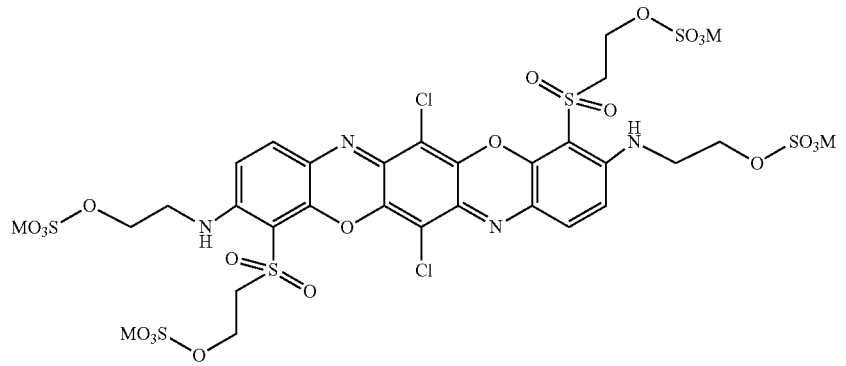
(II-2)
and

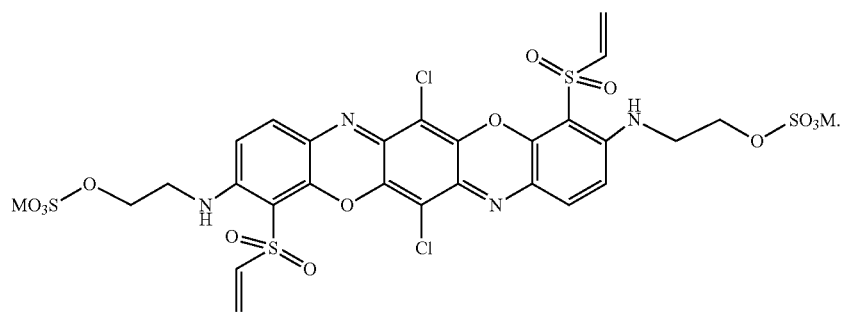
(II-3)

wherein independent of each other
M is hydrogen, an alkali metal or one equivalent of an alkaline earth metal.

10. The dye mixture according to claim 9, wherein the dye of formula (II) is a dye of formula (II-1) or (II-3).

11. The dye mixture according to claim 9, wherein the dye of formula (II) is a dye of formula (I-1), (I-3), (I-4), (I-6), (I-7), (I-8), (I-9) or (I-10).

12. The dye mixture according to claim 10, wherein the dye of formula (II) is a dye of formula (I-1), (I-3), (I-4), (I-6), (I-7), (I-8), (I-9) or (I-10).

13. The dye mixture according to claim 10, with a weight ratio of (I) 80 to 20% and (II) 20 to 80%.

14. The dye mixture according to claim 10, with a weight ratio of (I) 70 to 30% and (II) 30 to 70%.

15. The dye mixture according to claim 9, comprising at least one dye selected from the group consisting of dyes (I-2), (I-5) and (I-10) with at least one dye selected from the group consisting of dyes (II-2), (II-3).

* * * * *